United States Patent [19]

Ishiguro et al.

[11] Patent Number: 5,598,906
[45] Date of Patent: Feb. 4, 1997

[54] FLUID COUPLING CONTROL DEVICE OF AUTOMATIC TRANSMISSION

[75] Inventors: Toshiaki Ishiguro, Chita; Yoshinobu Iwase, Toyokawa, both of Japan

[73] Assignee: Aisin Seiki Kabushiki Kaisha, Kariya, Japan

[21] Appl. No.: 326,264

[22] Filed: Oct. 20, 1994

[30] Foreign Application Priority Data

Oct. 20, 1993 [JP] Japan .................................. 5-262668

[51] Int. Cl.$^6$ ................................................ F16H 45/02
[52] U.S. Cl. ........................................ 192/3.3; 74/732.1
[58] Field of Search ..................... 192/3.29, 3.3; 74/732.1

[56] References Cited

U.S. PATENT DOCUMENTS

| | | | |
|---|---|---|---|
| 4,828,084 | 5/1989 | Hasegawa et al. | 192/3.3 |
| 4,880,091 | 11/1989 | Hasegawa et al. | 192/3.3 |
| 5,054,590 | 10/1991 | Paulsen | 192/3.3 |

FOREIGN PATENT DOCUMENTS

| | | | |
|---|---|---|---|
| 4224472 | 1/1994 | Germany | 192/3.29 |
| 62-200070 | 9/1987 | Japan . | |

*Primary Examiner*—Richard M. Lorence
*Attorney, Agent, or Firm*—Burns, Doane, Swecker & Mathis, LLP

[57] ABSTRACT

A fluid coupling control device of an automatic transmission includes a turbine chamber into which an operation fluid flows, an operation chamber which is separated from the turbine chamber and into which the operation fluid flows, a clutch mechanism which engages and disengages the input member with the output member, a piston member slid by a fluid pressure difference between the operation chamber and the turbine chamber so as to engage and disengage the clutch mechanism, a fluid source which supplies the fluid to the operation chamber and the turbine chamber, and a control device disposed between the fluid source and the operation chamber which controls the fluid pressure in the operation chamber based on the fluid pressure in the turbine chamber.

7 Claims, 3 Drawing Sheets

FLUID COUPLING CONTROL DEVICE OF AUTOMATIC TRANSMISSION

BACKGROUND OF THE INVENTION

1. Field of the Invention

This invention relates to a coupling control device and more particularly to a fluid coupling control device of an automatic transmission.

2. Description of the Related Art

A conventional fluid coupling control device of an automatic transmission is disclosed in Japanese Patent Laid Open No. 62(1987)-200070. The fluid coupling control device disclosed in this document comprises a turbine chamber into which an operation fluid flows, with a driving power being transmitted through the operation fluid from an input member to an output member, an operation chamber which is separated from the turbine chamber and into which the operation fluid flows, a clutch mechanism which engages and disengages the input member with the output member, a piston member slid by a fluid pressure differential between the operation chamber and the turbine chamber so as to engage and disengage the clutch mechanism, a fluid source which supplies the fluid to the operation chamber and the turbine chamber, and a control device disposed between the fluid resource and the operation chamber which controls the supply of fluid to the operation chamber and the fluid drain from the operation chamber. The control device further includes an entrance port into which the fluid flows, a passage which introduces the fluid into the operation chamber from the fluid source, and a spool valve which opens and closes the passage and which is moved by the fluid so as to supply the fluid to the operation chamber and drain the fluid from the operation chamber.

Since the fluid which flows into the turbine chamber is used for cooling elements of the automatic transmission, the pressure in the turbine chamber varies depending upon the number of elements and conduits connecting the elements. Therefore, an engaging force of the clutch mechanism also varies because the piston member is moved by the fluid pressure differential between the operation chamber and the turbine chamber so as to engage and disengage the clutch mechanism. Consequently, a large shock is generated in the clutch mechanism when the clutch mechanism is engaged.

SUMMARY OF THE PRESENT INVENTION

It is an object of the present invention to provide a fluid coupling control device of an automatic transmission in which an engagement force of a clutch mechanism is not varied even under a fluid pressure variation in the turbine chamber.

It is another object of the present invention to provide a fluid coupling control device of an automatic transmission which is relatively small in size and light in weight.

It is a further object of the present invention to provide a fluid coupling control device of an automatic transmission which can be easily manufactured.

It is a further object of the present invention to provide a fluid coupling control device of an automatic transmission which is low in cost.

To achieve the above mentioned objects, a fluid coupling control device of an automatic transmission in accordance with the present invention comprises a turbine chamber into which an operation fluid flows, with the driving power being transmitted through the operation fluid from an input member to an output member, an operation chamber which is separated from the turbine chamber and into which the operation fluid flows, a clutch mechanism which engages and disengages the input member with the output member, a piston member slid by a fluid pressure differential between the operation chamber and the turbine chamber to engage and disengage the clutch mechanism, a fluid source which supplies fluid to the operation chamber and the turbine chamber, and control means disposed between the fluid source and the operation chamber for controlling the fluid pressure in the operation chamber based on the fluid pressure in the turbine chamber.

BRIEF DESCRIPTION OF THE DRAWINGS

The features and advantages of the fluid coupling control device of an automatic transmission according to the present invention will be more clearly appreciated from the following description considered in conjunction with the accompanying drawings figures in which like elements bear like reference numerals and wherein.

DETAILED DESCRIPTION OF PREFERRED EMBODIMENT OF THE INVENTION

Figure 1:
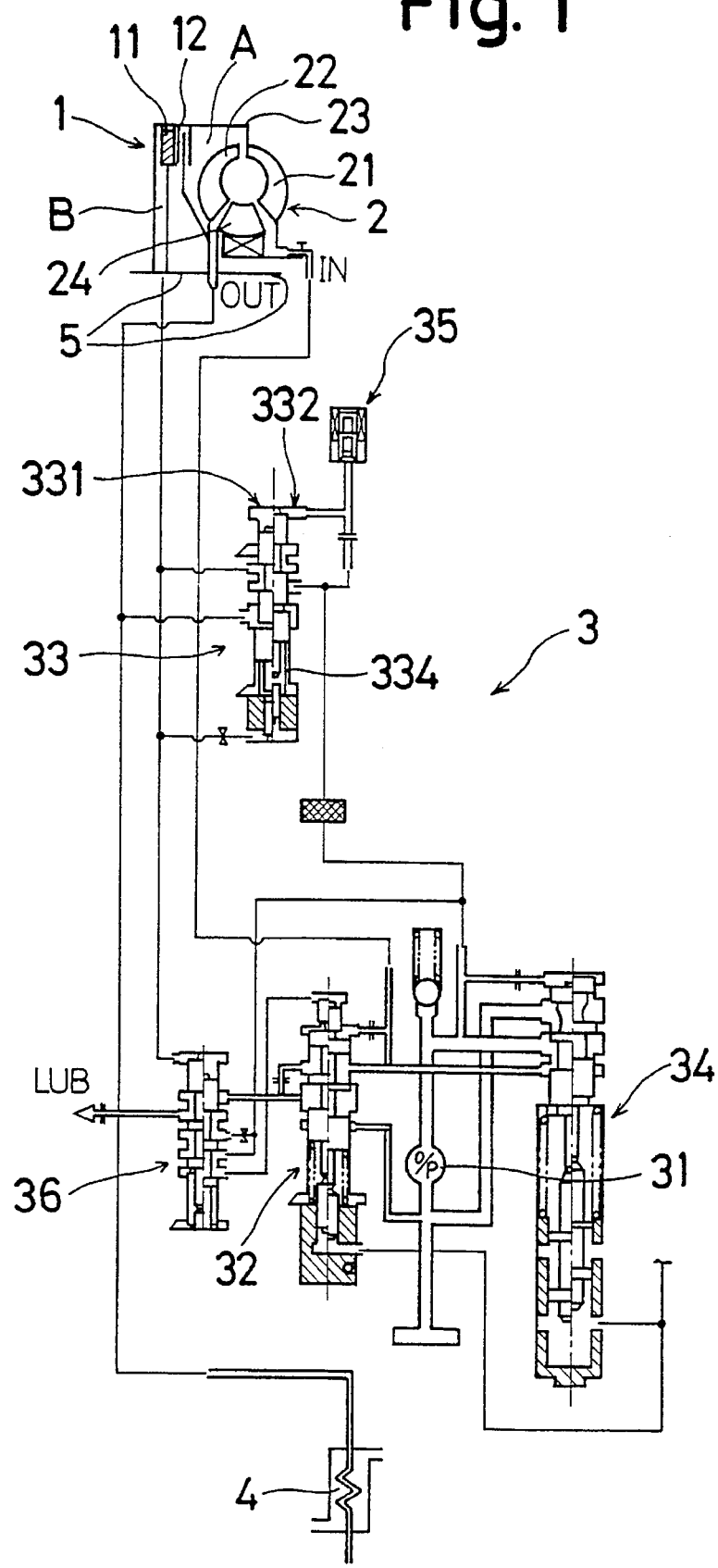
FIG. 1 is a circuit diagram of a fluid coupling control device of an automatic transmission of the present invention.

As seen with reference to FIG. 1, a fluid coupling control device of an automatic transmission comprises a lock up clutch mechanism 1 including a piston member 11 and a clutch member 12. The fluid coupling control device of an automatic transmission further comprises a torque converter mechanism 2 including a pump member 21 and a turbine member 22.

The pump member 21 and the turbine member 22 are disposed in a housing 23 into which an operation fluid flows. The pump member 21 of the torque converter mechanism 2 is connected with an output shaft of an engine through the housing 23 and the turbine member 22 is connected with an input shaft 5 of the transmission.

In accordance with this structure, a driving power is transmitted by the operation fluid from the pump member 21 to the turbine member 22 through a stationary member 24. The clutch member 12 is disposed between the turbine member 22 and the housing 23. The piston member 11 is slidably disposed in the housing 23 to engage the clutch member 12 with the pump member 21. When the piston member 11 is moved by the fluid flowing into the housing 23, the driving power is directly transmitted from the pump member 21 to the turbine member 22. A chamber in the housing 23 is partitioned into a turbine chamber A and an operation chamber B. A turbine fluid which transmits the driving power from the pump member 21 to the turbine member 22 flows into the turbine chamber. A control fluid which moves the piston member 11 flows into the operation chamber B.

A fluid pressure circuit 3 includes a secondary regulator valve 32, a lock up control valve 33, a primary regulator valve 34 and a lubrication valve 36. A fluid pump 31 is connected to the turbine chamber A through the primary regulator valve 34 and the secondary regulator valve 32 and is connected to an entrance of the operation chamber B through the lock up control valve 33. An exit of the turbine chamber A is connected to a cooler 4 so that the turbine fluid is used for cooling elements of the automatic transmission.

The lock up control valve 33 switches the fluid supply from the fluid pump 31 to the operation chamber B and the fluid drain from the operation chamber B so as to regulate the quantity of fluid which flows into the operation chamber B. The secondary regulator valve 32 and the primary regulator valve 34 are used for controlling the quantity of fluid which flows into the turbine chamber A from the fluid pump 31. The lubrication valve 36 is connected with the secondary regulator valve 32 so that a part of the fluid which flows into the turbine chamber A from the fluid pump 31 can lubricate the elements of the automatic transmission. The lubrication valve 36 further connects with the operation chamber B so as to be switched depending on the fluid supply to the operation chamber B. Since the construction of the secondary regulator valve 32, the primary regulator valve 34 and the lubrication valve 36 are conventional, detailed explanations of their constructions will be omitted.

Figure 2:
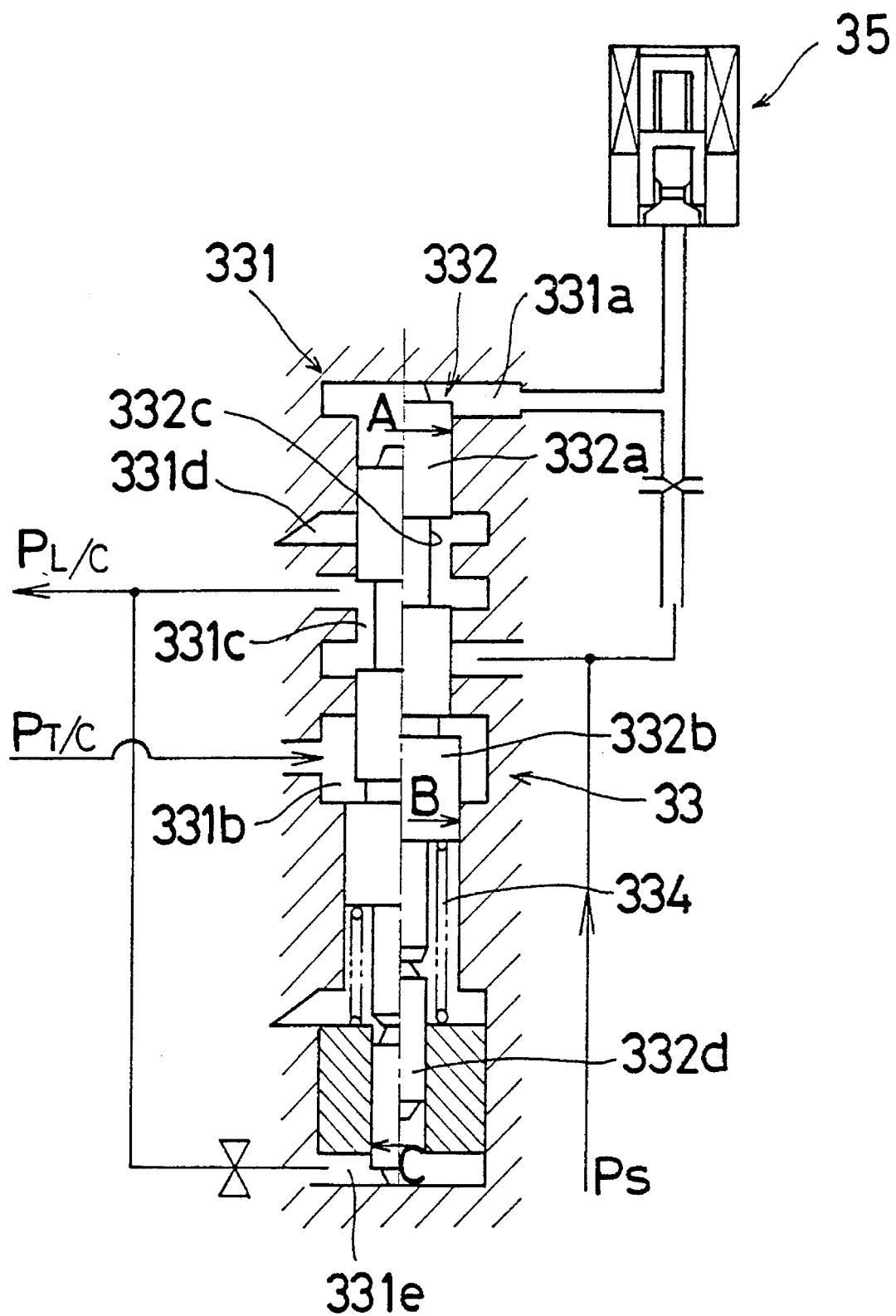
FIG. 2 is a cross-sectional view of a control means of the present invention.

As shown in FIGS. 1 and 2, the lock up control valve 33 includes a body 331 and a spool member 332. The spool member 332 is slidably disposed in the body 331. The spool member 332 includes a first piston portion 332a, a second piston portion 332b, a third piston portion 332d and a fluid passage 332c disposed between the first and second piston portions 332a, 332b. The first piston portion 332a includes a pressure receiving surface which has a predetermined area A. The second piston portion 332b includes a pressure receiving surface having an area B which is larger than that of the first piston portion 332a. The third piston portion 332d includes a pressure receiving surface having an area C which is equal to the difference in area between the first and second piston portions 332a, 332b.

The spool member 332 is always biased by a spring member 334 in the upper direction shown in FIGS. 1 and 2. The body 331 includes a first entrance port 331a connected to the fluid pump 31, a second entrance port 331b connected to the exit of the turbine chamber A, a passage 331c of which an entrance is connected to the fluid pump 31 and an exit is connected to the operation chamber B, a drain port 331d which is connected to the exit of the passage 331c and a third entrance port 331e also connected to the exit of the passage 331c. The operation fluid pumped out from the fluid pump 31 flows into the first entrance portion 331a so as to apply a force to the first piston portion 332a. The fluid which flows into the second entrance port 331b from the turbine chamber A biases or applies a force to the second piston portion 332b. A solenoid valve 35 is disposed between the fluid pump 31 and the first entrance port 331a to connect and disconnect the fluid pump 31 with the first entrance port 331a.

The operation of the lock up control valve 33 will be described hereinafter. When the solenoid valve 35 disconnects the conduit between the fluid pump 31 and the first entrance port 331a of the lock up control valve 33, the spool member 332 is arranged in the body 331 in the manner shown on the right side portion of FIG. 2 with respect to the longitudinal axis by the elastic force of the spring member 334. As a result, the operation chamber B is disconnected from the fluid pump 31 and the operation chamber B is connected to the drain port 331d. Therefore, the operation fluid is drained from the drain port 331d so as to disengage the clutch member 12 from the pump mechanism 1. Further, the turbine fluid flows into the entrance of the turbine chamber A from the fluid pump 31 and flows out from the exit of the turbine chamber A. The turbine fluid transmits the driving power to the turbine member 22 from the pump member 21 and the turbine fluid flows into the cooler 4. Although the second piston portion 332b receives the pressure force of the turbine fluid which flows from the turbine chamber A in the lower direction shown in FIG. 2, the spool member 332 is not moved in the lower direction because the pressure force of the turbine fluid is smaller than the elastic force of the spring member 334.

When the solenoid valve 35 is operated, the fluid pump 31 is connected to the first entrance port 331a. Therefore, fluid pressure is applied to the first piston portion 332a to move the spool member 332 in the lower direction against the elastic force of the spring member 334. Consequently, the spool member 332 is arranged in the body 331 in the manner shown in the left side portion of FIG. 2 with respect to the longitudinal axis so that the drain port 33 1 d is disconnected from the operation chamber B and so that the operation chamber B is connected with the fluid pump 31. Therefore, the control fluid flows into the operation chamber B from the fluid pump 31. In that way, the piston member 11 moves and engages the clutch mechanism 1. The turbine member 22 is directly driven by the pump member 21. Further, the control fluid is also supplied to the third entrance port 331e from the exit of the passage 331c.

At this time, the spool member 332 is defined under the condition of the following formula.

$$Ps \times A + P_{T/C} \times (B-A) = Fs + P_{L/C} \times C, \text{ where}$$

A: fluid pressure receiving area of the first piston portion 332a;

B: fluid pressure receiving area of the second piston portion 332b;

C: fluid pressure receiving area of the third piston portion 332c.

Figure 3:
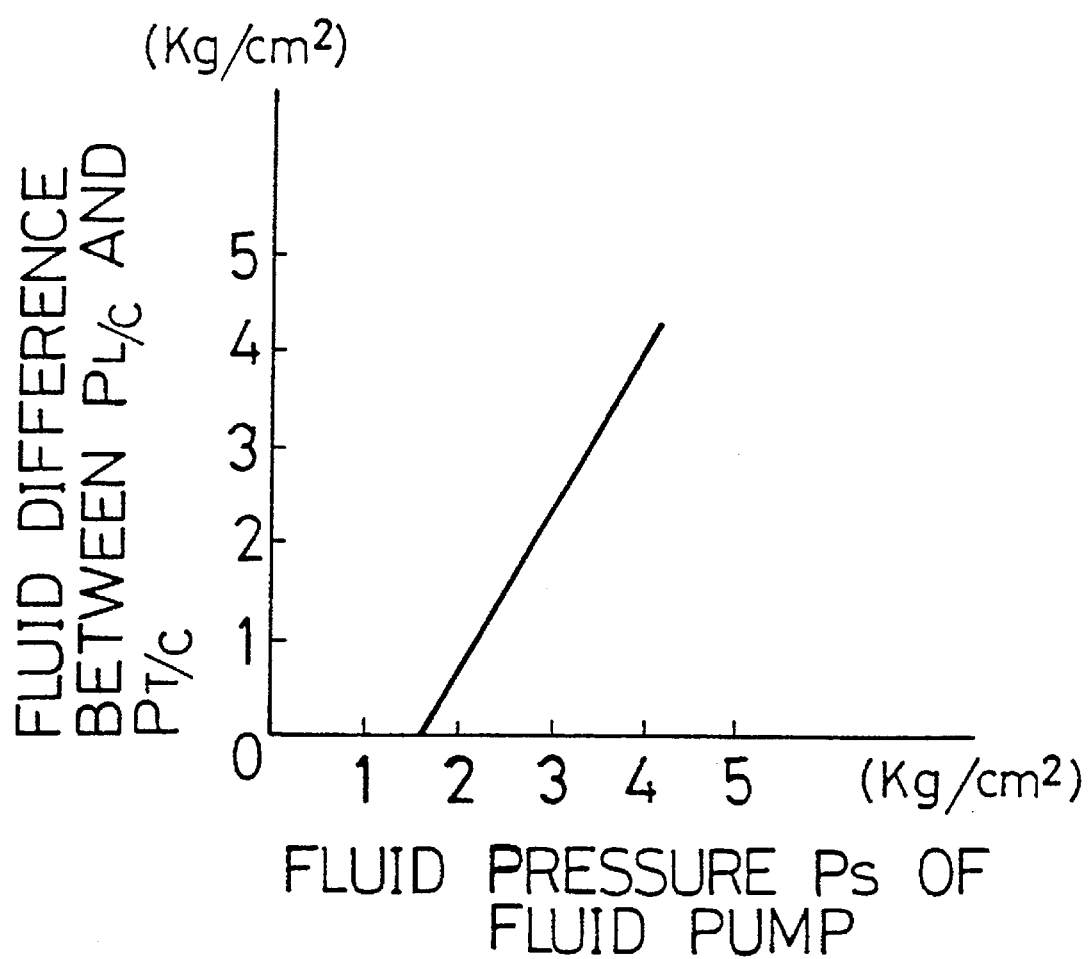
FIG. 3 is a diagram in explaining an operation of a fluid coupling control device of an automatic transmission of the present invention.

Therefore, as the fluid pressure $P_{T/C}$ supplied to the second entrance port 331b from the turbine chamber A becomes higher, the fluid pressure $P_{L/C}$ supplied to the operation chamber B also becomes higher. That is, the fluid pressure in the operation chamber B is controlled based on the fluid pressure in the turbine chamber A. Therefore, although variations of the fluid pressure in the turbine chamber A are generated by the occurrence of the cooler 4, the fluid pressure differential between the turbine chamber A and the operation chamber B is always in proportion to the fluid pressure Ps generated by the fluid pump 31 as shown in FIG. 3. Consequently, the magnitude of the engagement force of the clutch mechanism 1 is arranged to be appropriate relative to the fluid pressure Ps. Therefore, a shock is not generated in the clutch mechanism 1 when the clutch mechanism 1 is engaged.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A fluid coupling control device of an automatic transmission comprising:

a turbine chamber into which an operation fluid flows, a driving power being transmitted through the operation fluid from an input member to an output member;

an operation chamber which is separated from the turbine chamber and into which the operation fluid flows;

a clutch mechanism which engages and disengages the input member with the output member;

a slidable piston member which is slid on the basis of a fluid pressure differential between the operation chamber and the turbine chamber to effect engagement and disengagement of the clutch mechanism;

a fluid source for supplying fluid to the operation chamber and the turbine chamber; and control means connected to the turbine chamber and the operation chamber and disposed between the fluid source and the operation chamber for controlling the fluid pressure in the operation chamber based on the fluid pressure in the turbine chamber so that the fluid pressure differential between the turbine chamber and the operation chamber is proportional to the fluid pressure generated by the fluid source.

2. A fluid coupling control device of an automatic transmission as recited in claim 1, wherein the control means includes a body, a spool member slidably disposed in the body and a spring member biasing the spool member in one direction, the body further including a first entrance port into which the fluid flows from the fluid source so as to force the spool member in a direction against an elastic force of the spring member, a second entrance port into which fluid flows from the turbine chamber so as to force the spool member in the direction against the elastic force of the spring member, and a passage which selectively connects the operation chamber with the fluid source or a drain port.

3. A fluid coupling control device of an automatic transmission as recited in claim 2, wherein the spool member includes a first piston portion having a fluid pressure receiving surface, a second piston portion having a fluid pressure receiving surface, and a third piston portion having a fluid pressure receiving surface, the fluid pressure receiving surface of the second piston portion having an area that is larger than the area of the fluid pressure receiving surface of the first piston portion, the fluid pressure receiving surface of the third piston portion being equal to the difference in area between the fluid pressure receiving surface of the first piston portion and the fluid pressure receiving surface of the second piston portion.

4. A fluid coupling control device for an automatic transmission comprising:

a housing in which is located a chamber that is divided into a turbine chamber into which an operation fluid flows and an operation chamber into which the operation fluid flows, the turbine chamber and the operation chamber being separate from one another and the operation fluid serving to transmit driving power from an input member to an output member;

a clutch mechanism for engaging and disengaging the input member with respect to the output member;

a piston member slidably disposed in the housing for being moved based on a fluid pressure differential between the operation chamber and the turbine chamber to engage and disengage the clutch mechanism;

a fluid source for supplying fluid to the operation chamber and the turbine chamber; and a control valve disposed between the fluid source and the operation chamber for controlling the fluid pressure in the operation chamber in dependence upon the fluid pressure in the turbine chamber so that the fluid pressure differential between the turbine chamber and the operation chamber is proportional to the fluid pressure generated by the fluid source, said control valve including a spool member movably positioned in a body, a first entrance port in the body which is connected to the fluid source, and a second entrance port in the body which is connected to the turbine chamber.

5. A fluid coupling control device of an automatic transmission as recited in claim 4, wherein the control valve also includes a spring which biases the spool member in a first direction, the first entrance port in the body receiving fluid from the fluid source to apply a force to the spool member in a direction opposite said first direction, the second entrance port in the body receiving fluid from the turbine chamber to apply a force to the spool member in a direction opposite said first direction.

6. A fluid coupling control device of an automatic transmission as recited in claim 4, wherein the control valve also includes a drain port for draining fluid from the operation chamber and a passage for connecting the operation chamber to either the fluid source or the drain port based on a position of the spool member within the body.

7. A fluid coupling control device of an automatic transmission as recited in claim 4, wherein the spool member includes a first piston portion having a fluid pressure receiving surface, a second piston portion having a fluid pressure receiving surface, and a third piston portion having a fluid pressure receiving surface, the fluid pressure receiving surface of the second piston portion having an area that is larger than the area of the fluid pressure receiving surface of the first piston portion, the fluid pressure receiving surface of the third piston portion being equal to the difference in area between the fluid pressure receiving surface of the first piston portion and the fluid pressure receiving surface of the second piston portion.

* * * * *